United States Patent
Vitsnudel et al.

(10) Patent No.: US 8,155,478 B2
(45) Date of Patent: Apr. 10, 2012

(54) IMAGE CREATION WITH SOFTWARE CONTROLLABLE DEPTH OF FIELD

(75) Inventors: Ilia Vitsnudel, Even Yeuda (IL); Noam Sorek, Yaakov (IL)

(73) Assignee: Broadcom Corporation, Irvine, CA (US)

(*) Notice: Subject to any disclaimer, the term of this patent is extended or adjusted under 35 U.S.C. 154(b) by 1170 days.

(21) Appl. No.: 11/924,676

(22) Filed: Oct. 26, 2007

(65) Prior Publication Data

US 2008/0101728 A1    May 1, 2008

Related U.S. Application Data

(60) Provisional application No. 60/854,428, filed on Oct. 26, 2006.

(51) Int. Cl.
*G06K 9/20*    (2006.01)
(52) U.S. Cl. .................................... 382/276; 382/317
(58) Field of Classification Search .................. 382/254, 382/255, 294, 299, 325; 348/349, E5.045
See application file for complete search history.

(56) References Cited

U.S. PATENT DOCUMENTS

| | | | | |
|---|---|---|---|---|
| 4,661,986 A | * | 4/1987 | Adelson | 382/154 |
| 5,282,045 A | * | 1/1994 | Mimura et al. | 348/352 |
| 7,336,430 B2 | * | 2/2008 | George et al. | 359/708 |
| 7,623,726 B1 | * | 11/2009 | Georgiev | 382/255 |
| 7,936,392 B2 | * | 5/2011 | Ng et al. | 348/349 |

OTHER PUBLICATIONS

Agarwala, et al. "Interactive Digital Photomontage" ACM Transactions on Graphics (Proceedings of SIGGRAPH 2004), 2004.*
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.*

* cited by examiner

*Primary Examiner* — Stephen Koziol
(74) *Attorney, Agent, or Firm* — Brinks Hofer Gilson & Lione

(57) ABSTRACT

A method of controlling depth of field of an image by a computer after the image has been taken based on the data acquired while taking the images including, acquiring multiple images from the same perspective with different focal points, selecting parameters for preparing a displayable image, constructing an image using the data of the acquired multiple images according to the selected parameters; and displaying the constructed image.

20 Claims, 5 Drawing Sheets

IMAGE CREATION WITH SOFTWARE CONTROLLABLE DEPTH OF FIELD

RELATED APPLICATIONS

This application claims priority from US provisional application No. 60/854,428 filed on Oct. 26, 2006, the disclosure of which is incorporated herein by reference.

FIELD OF THE INVENTION

The present invention relates generally to the creation of images and specifically to creating images with the ability to control their depth of field using software.

BACKGROUND OF THE INVENTION

When taking pictures a photographer controls the focus distance by using various tenses or by adjusting the shutter size and/or lens distance from the point in the camera that records the picture. The focus distance is the distance from the camera in which objects are maximally focused relative to the rest of the picture. Around the focus distance is an area which is essentially focused at least above a certain threshold level. The picture can be adjusted to have certain areas focused and certain areas blurred, for example an object at a specific distance can be focused with everything else blurred. Alternatively, the picture can be focused from a specific distance, up to a specific distance or between two distances. Typically the focused area with a reasonable level of clarity is referred to as the depth of field.

In some cases the required depth of field cannot be achieved with the camera being used, for example to have an image focused with a blurred background generally requires a wide shutter opening that is not available on simple cameras (e.g. point and shoot cameras). Alternatively, it may be desired to have the entire image focused when the lighting is poor, the focusing requires a small shutter opening whereas the lighting requires a large shutter opening or long exposure time.

Generally, once the picture is taken the ability to change the focal distance of the picture is very limited. In recent years with the growth in digital imaging various techniques have been proposed to improve images. Some techniques use image processing methods to achieve better focused images. Other techniques use special optics to collect more light during the picture shoot and then digitally process the image to achieve a sharper image.

U.S. Pat. No. 7,003,177 describes the use of multi-exposure techniques to provide an image with an extended depth of field.

U.S. Pat. No. 6,876,763 describes a method of improving the resolution of an image using a color mosaic sensor.

SUMMARY OF THE INVENTION

An aspect of an embodiment of the invention, relates to a system and method for producing images with a controllable depth of field that is adjusted by a user after the images were already taken. In an exemplary embodiment of the invention, an imaging device is used to acquire multiple images and provide the image data to a computer for processing. Optionally, a single imaging device is used to acquire multiple images. Alternatively, multiple imaging devices are used to acquire multiple images.

In some embodiments of the invention, the variance in refraction of different wave lengths of light is used to construct multiple images from a single color image. In some embodiments of the invention, the multiple images are acquired simultaneously. Alternatively, the multiple images are acquired sequentially. In an exemplary embodiment of the invention, the data for the multiple images is provided to the computer and the computer displays a single image.

Optionally, a user views the image on the display of the computer and selects parameters defining the depth of field desired by the user. The computer uses the data provided for the multiple images and constructs a new image with a depth of field corresponding to the user's selections.

In some embodiments of the invention, the user may select depths of field corresponding to the images constructed by the computer. Alternatively, the user may select a continuous focused area, which will be constructed by combining details from the available images.

There is thus provided according to an exemplary embodiment of the invention, a method of controlling depth of field of an image by a computer after the image has been taken based on the data acquired while taking the image, comprising:

acquiring multiple images from the same perspective with different focal points;

selecting parameters for preparing a displayable image;

constructing an image using the data of the acquired multiple images according to the selected parameters; and displaying the constructed image.

Optionally, the acquiring is performed using a single imaging device. In an exemplary embodiment of the invention, the acquiring comprises:

taking a single multicolor image with the imaging device, wherein each color has a different focal point;

separating the image to sub images each with the data of a different color;

constructing a color image from each sub image by combining it with the data of the other sub images adjusted according to the focal point of the sub image being used to construct the color image.

In an exemplary embodiment of the invention, the acquiring is performed using multiple imaging devices located next to each other and focused to different positions along a common axis. Optionally, each image acquired by the multiple imaging devices forms a multicolor image and is used to create multiple images by separating each multicolor image to sub images, each with the data of a different color, wherein each color has a different focal point; and then constructing a color image from each sub image by combining it with the data of the other sub images adjusted according to the focal point of the sub image being used to construct the color image. In an exemplary embodiment of the invention, the selecting is performed before taking images. Optionally, the selecting is performed after taking images. In an exemplary embodiment of the invention, the selecting is performed automatically by the computer based on the content of the images. Optionally, the selected parameters enable the user to select focal points which correspond to the focal points of the acquired multiple images. In an exemplary embodiment of the invention, the selected parameters enable the user to select focal points which form a continuum from the closest focal point to the furthest focal point available in the acquired images. Optionally, the selected parameters define a single continuous area that is displayed in focus. In an exemplary embodiment of the invention, the selected parameters define more than one continuous area that is displayed in focus. Optionally, the selected parameters define a continuous area that is displayed in focus up to a selected point. In an exemplary embodiment of the invention, the selected parameters define a continuous area that is displayed in focus from a selected point. Optionally, the acquiring is performed by taking multiple images sequentially while adjusting the focal point of the lens between each image. In an exemplary embodiment of the invention, the acquiring is performed by taking multiple images simultaneously.

There is further provided according to an exemplary embodiment of the invention, a system for controlling depth of field of an image after the image has been taken based on the data acquired while taking the image, comprising:

an imaging device to record image data;

a mosaic image sensor installed in the imaging device to convert light to digital data;

a computer to analyze the data recorded by the mosaic image sensor;

a display to display images provided by the computer wherein the computer is adapted to construct multiple images from the data provided by the mosaic image sensor resulting from a single image, receive input from a user defining parameters for displaying an image, and construct an image to conform to the parameters using the data provided by the mosaic image sensor resulting from a single image.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
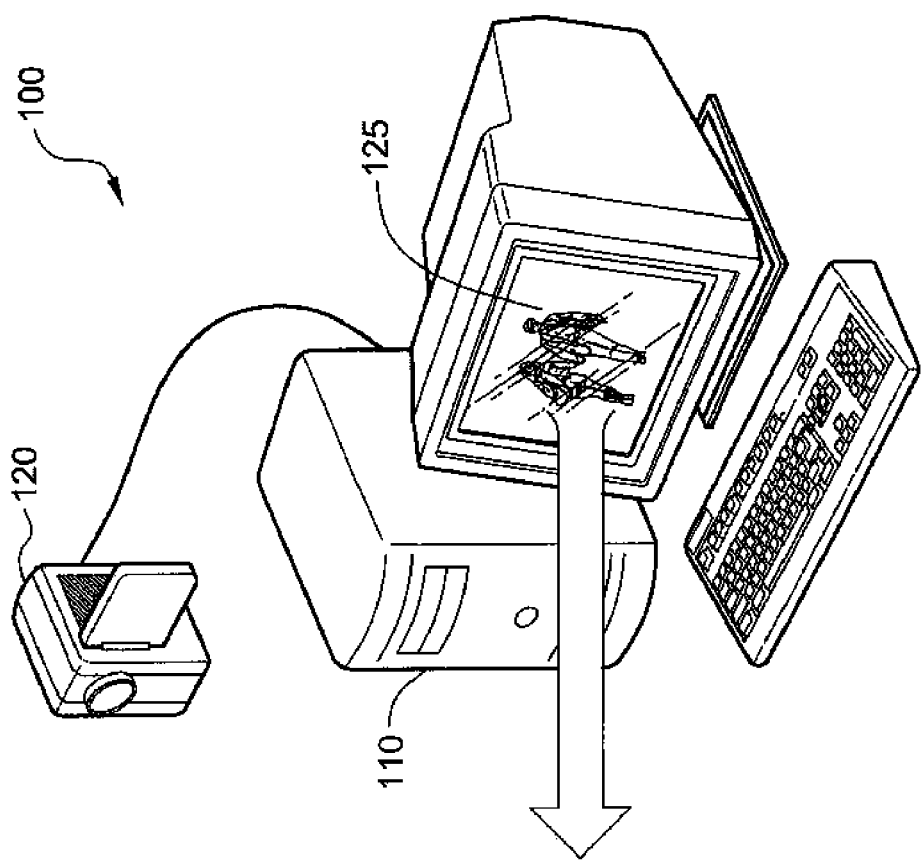
FIG. 1 is a schematic illustration of a computerized system for controlling the depth of field of images, according to an exemplary embodiment of the invention.

FIG. 1 is a schematic illustration of a computerized system 100 for controlling the depth of field of images, according to an exemplary embodiment of the invention. In an exemplary embodiment of the invention, system 100 includes a computer 110 that is provided with an image 125 from an imaging device 120 to display to a user. Optionally, imaging device 120 may be a device that provides videos comprising sequences of images (e.g. a video camera) or may be a device that provides single images (e.g. a still camera). In an exemplary embodiment of the invention, computer 110 may be any type of general purpose computer or any type of computing device, for example an electronic chip in a camera that is programmed to perform the required functions.

In an exemplary embodiment of the invention, image 125 is provided to computer 110 in a form that allows computer 110 to adjust the depth of field of each image along an axis 130, after it is already taken as if the user was controlling the lens of imaging device 120 before taking the picture. Optionally, the user can adjust the depth of field of image 125 so that the focal point will be a specific point from a plurality of focal points 150 along axis 130, between two focal points 150 along axis 130, from a specific point focal 150 to infinity, or other variations.

In an exemplary embodiment of the invention, by selecting the depth of field of the image, certain items become sharper and certain items become less clear depending on their position along axis 130 relative to the selected depth of field.

Figure 2:
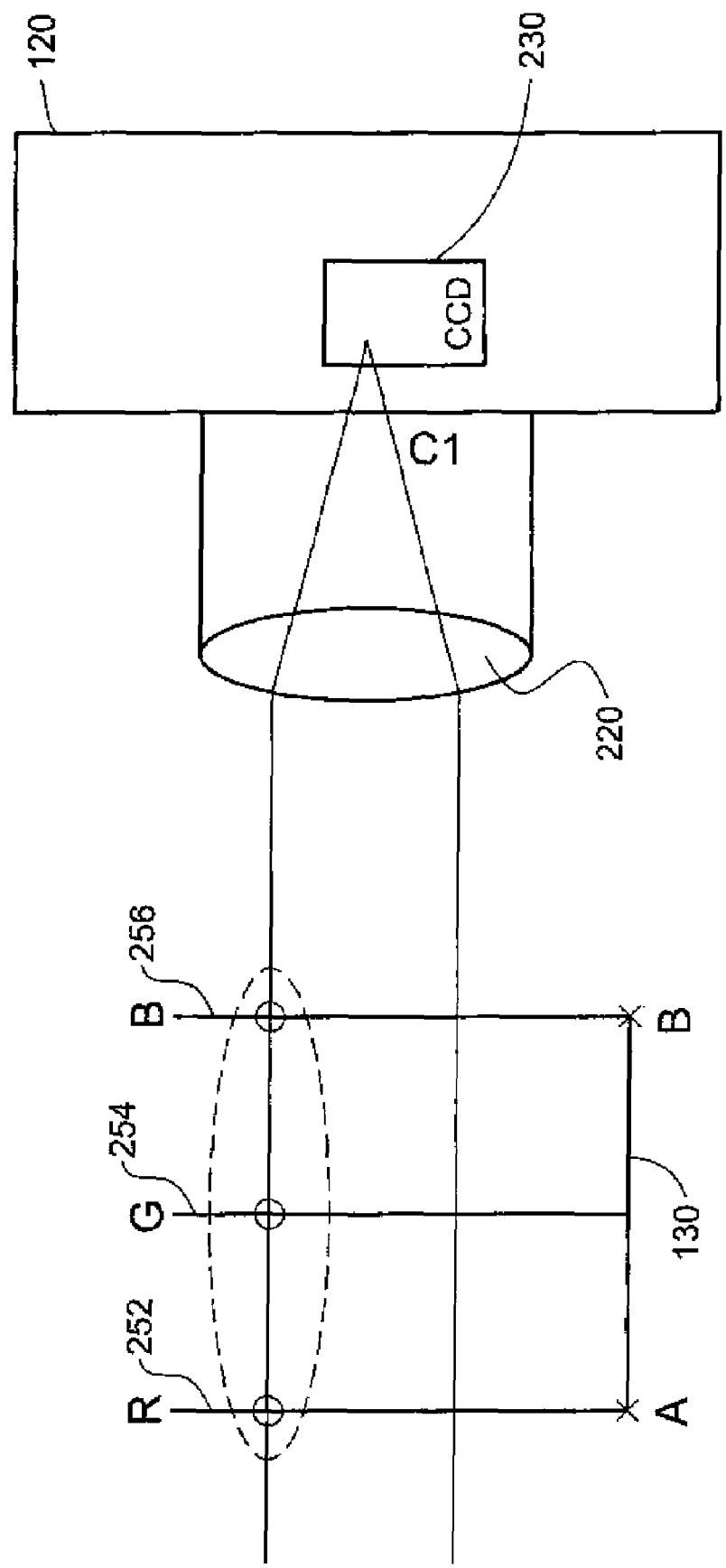
FIG. 2 is a schematic illustration of an imaging device and multiple focal points for different wavelengths of light, according to an exemplary embodiment of the invention.

FIG. 2 is a schematic illustration of imaging device 120 and multiple focal points 250 for different wavelengths of light, according to an exemplary embodiment of the invention. In an exemplary embodiment of the invention, imaging device 120; includes a lens 220 that is adapted to focus light onto a mosaic image sensor 230 (e.g. a CCD sensor or a CMOS sensor) for producing digital images.

Figure 3:
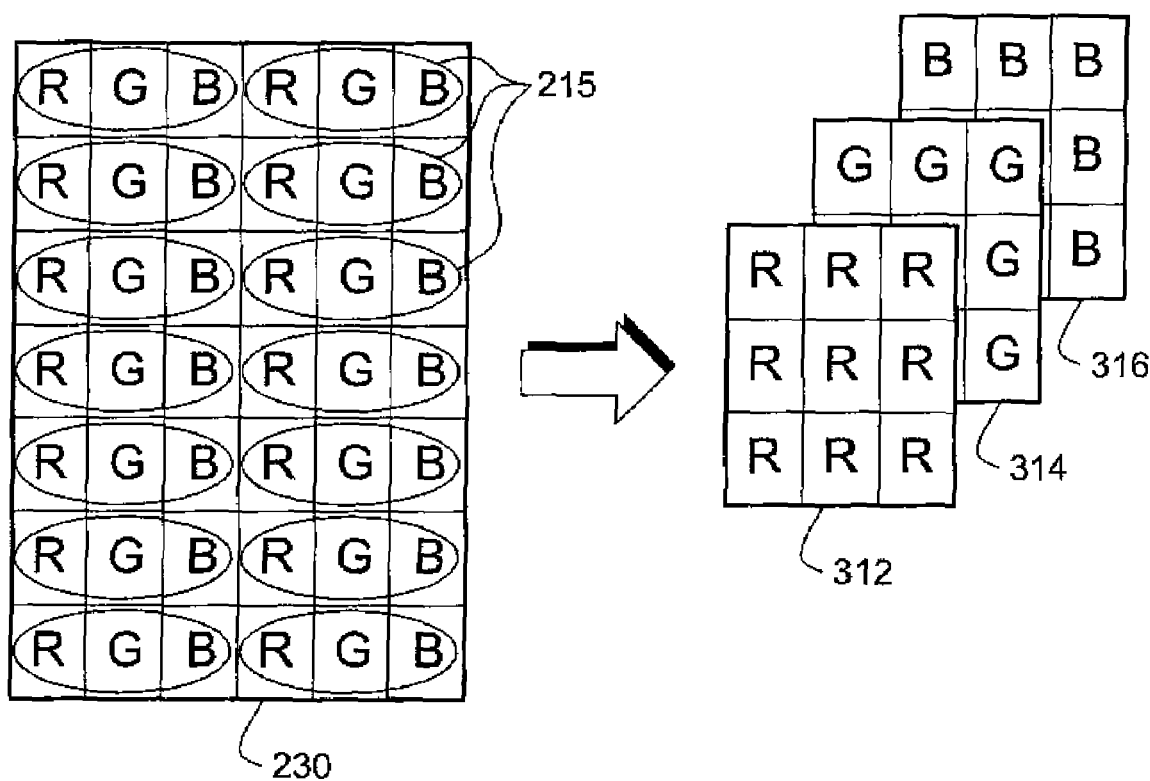
FIG. 3 is a schematic illustration of a mosaic image sensor for recording a digital image, according to an exemplary embodiment of the invention.

FIG. 3 is a schematic illustration of mosaic image sensor 230 for recording a digital image, according to an exemplary embodiment of the invention. In an exemplary embodiment of the invention, each pixel 215 of mosaic image sensor 230 records an intensity value for 3 colors, for example red (R), green (G) and blue (B), together forming a color image. Optionally, the actual pixel layout may differ from the simplified picture described here, however according to an exemplary embodiment of the invention, the values recorded by mosaic image sensor 230 can be separated to form 3 separate matrices 312, 314, 316, one for each color. Due to the nature of light waves each color bends slightly differently through lens 220, so that the focal points for each matrix (312, 314, 316) do not occur at the same position, but rather at three different points (252, 254, 256) as shown in FIG. 2.

As is known in the art, if we select one of the colors as the base for constructing a focused image and use an adjusted value for the other two colors we can create 3 color images, wherein each is focused to a different focal point (252, 254, or 256). Optionally, in forming the focused image for each color a luminance value is constructed based on the exact intensity values of one of the colors and by using adjusted values for the other two colors, which compensate for the offset of their focal point relative to the focal point of the image being formed.

In an exemplary embodiment of the invention, 3 images 125 corresponding to 3 focal points 250 can be constructed using a single imaging device 120 with a single lens 220, and using a mosaic image sensor 230 which records 3 colors for each pixel. Thus the user of computer 110 is then able to request to view each image 125 adjusted according to any of the 3 basic focal points (252, 254, and 256). Optionally, computer 110 uses the data available for the image to construct the image with the focal point selected by the user. In an exemplary embodiment of the invention, computer 110 uses the data to form images with focal points corresponding to the intermediate positions between the three basic focal points (252, 254, and 256), thus allowing the user to select image 125 focused according to any point, continuously along axis 130, between point 252 to point 256.

In an exemplary embodiment of the invention, the user can select that computer 110 will form image 125 for display such that it is focused to a specific point along axis 130, with the objects in front of the specific point and behind it less clear. Alternatively, the user can select that computer 110 will form image 125 for display, wherein the resulting image 125 will be focused throughout all of axis 130, by combining the focused data from the 3 images. Optionally, computer 110 can form image 125 so that it is focused up until a specific point or from a specific point until infinity.

In some embodiments of the invention, computer 110 can enable the user to select non-continuous areas along axis 130, wherein the objects in image 125 that are physically located at the selected areas will be shown in focus and objects outside the selected areas will be out of focus, or vice versa.

In some embodiments of the invention, computer 110 enables standard graphic processing in addition to providing the user with a controllable depth of field, for example to replace colors, combine images or other manipulations.

In some embodiments of the invention, computer 110 and imaging device 120 are provided with parameters from the user before taking images, to allow general adjustment, for example adjusting lens 120. Optionally, the controllable depth of field will perform fine tuning on the results, for example the user may select the photographic mode or photographic application (e.g. macro photography, outdoor photography or studio photography) and computer 110 will be used to fine tune the results. In some embodiments of the invention, the computer may select parameters automatically according to the content of the images, for example to place a dominant object in focus with a blurred background.

Figure 4:
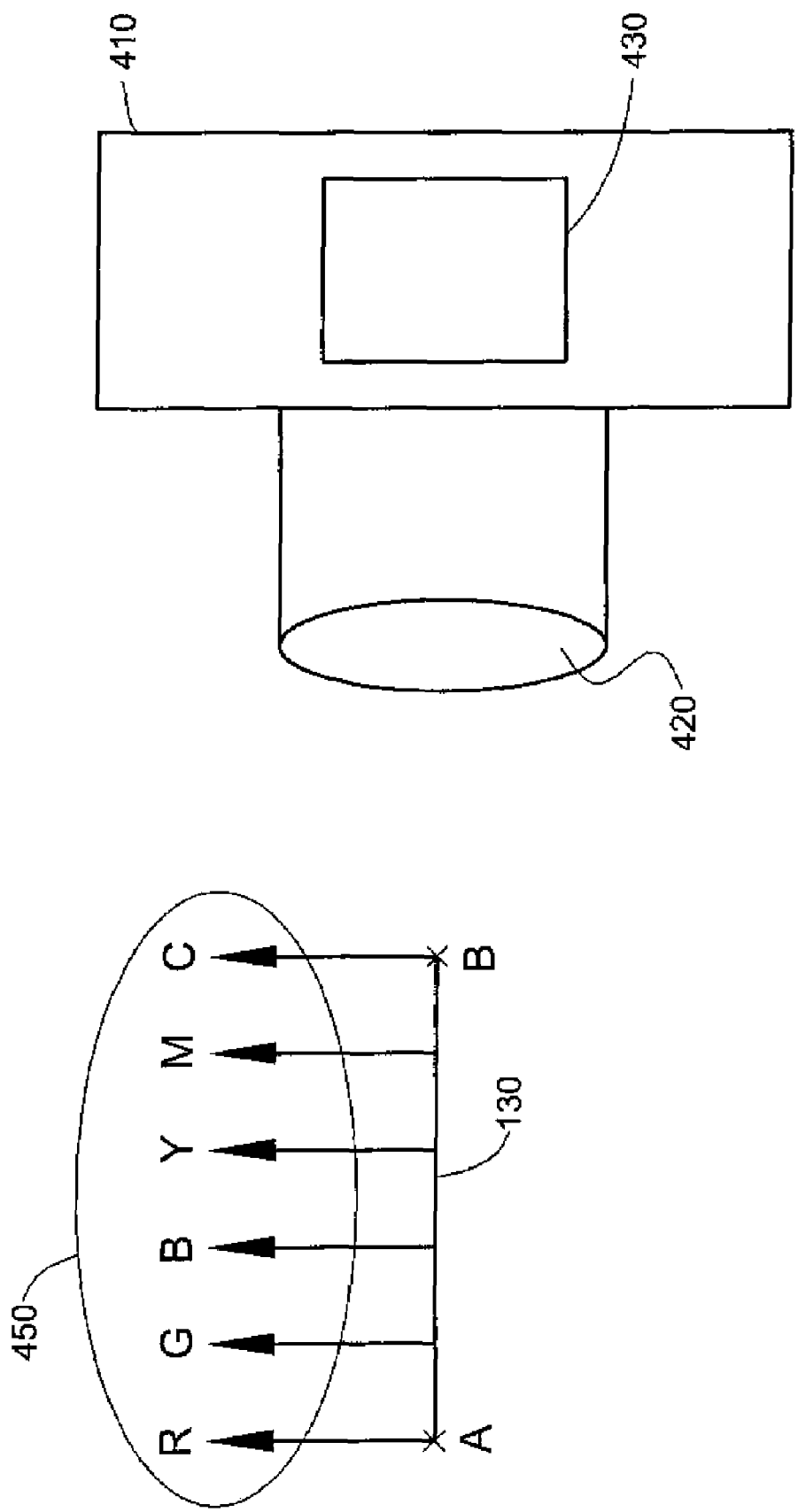
FIG. 4 is a schematic illustration of an imaging device with an enhanced mosaic image sensor supporting multiple focus points, according to an exemplary embodiment of the invention.

In some embodiments of the invention, various methods and devices are used to enhance accuracy of the controllable depth of field images and to enlarge the area along axis 130 for which real focused image data is acquired. FIG. 4 is a schematic illustration of an imaging device 410 with an enhanced mosaic image sensor 430 supporting multiple focus points, according to an exemplary embodiment of the invention. Enhanced mosaic image sensor 430 acquires more than three colors for each pixel, for example using 6 colors for each pixel (e.g. R-red, G-green, B-blue, Y-yellow, M-magenta, C-cyan), thus allowing computer 110 to construct 6 images with 6 different focal points 450. Optionally, more complex mosaic image sensors can be used with more or less colors per pixel. In some embodiments of the invention, imaging device 410 uses a lens 420 that deliberately increases the distance between the focal point for each color to extend the controllable area on axis 130. Optionally, this is in contrast to lenses in conventional cameras that come with lenses that attempt to minimize the distance between focal points for each color to acquire an image with less distortion.

Figure 5:
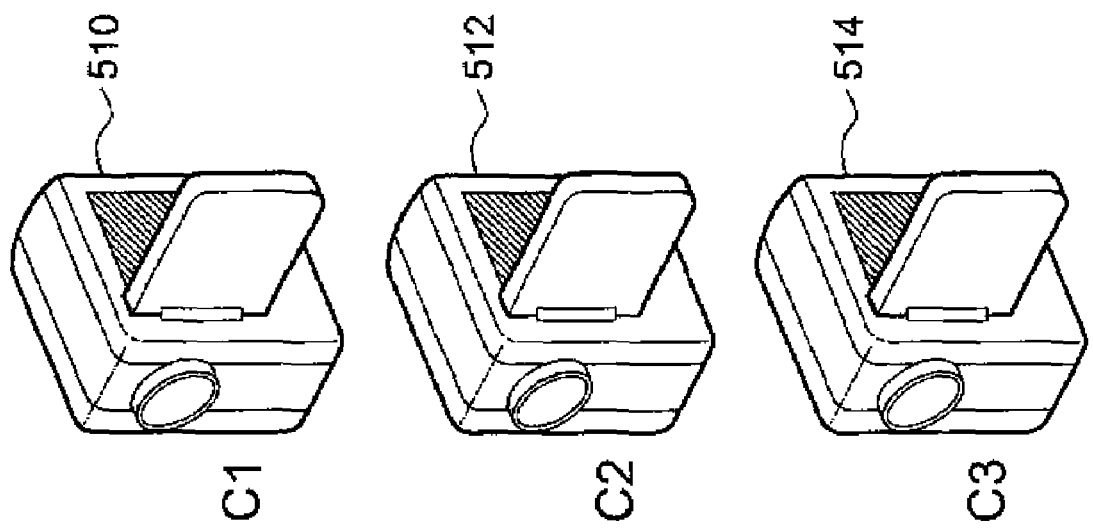
FIG. 5 is a schematic illustration of multiple imaging devices supporting multiple focus points, according to an exemplary embodiment of the invention.
Figure 5:
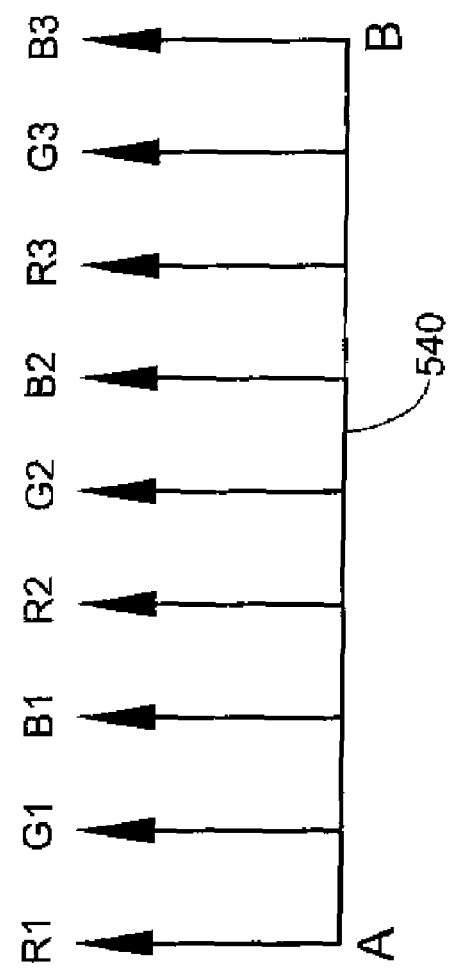

FIG. 5 is a schematic illustration of multiple imaging devices (510, 512, 514) supporting multiple focal points, according to an exemplary embodiment of the invention. Optionally, each image is provided to computer 110 based on pictures taken by multiple imaging devices pointing in the same direction along an axis 540 and covering essentially the same area, but differing in their focal point. Optionally, by focusing each imaging device to a different position along axis 540 a wider controllable depth of field can be achieved, for example with 9 focal points (e.g. 3 imaging devices with mosaic sensors supporting 3 colors) as shown in FIG. 5. Optionally, more or less imaging devices can be used and each imaging device may support a different number of colors as explained above regarding FIG. 4.

In some embodiments of the invention, a single imaging device may comprise multiple lenses and/or multiple mosaic image sensors to provide multiple focal points.

In an exemplary embodiment of the invention, initially imaging device 120 is calibrated with computer 110 so that when acquiring images 125, computer 110 knows which data correlates to which position along axis 130. Thus for example if a user requests to view image 125 focused to point 252, computer 110 knows to reconstruct the image using the red matrix as the main data source and adjusted by the data from green and blue as described above. If the image needs to be focused to a point between point 252 and point 254, computer 110 uses the matrix of the closest image position as found in the calibration process as a base and adjusts it with the other matrices.

In some embodiments of the invention, multiple images may be taken sequentially over a short period of time using a lens that is focused differently from image to image, for example 30 frames per second at different focus settings. Optionally, computer 110 can be calibrated to accept such a sequence and process it to provide a set of images at different focal points, so that it may provide a controllable depth of field as described above.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of controlling depth of field of an image by a computer after the image has been taken based on the data acquired while taking the image, comprising:
   acquiring concurrently multiple images from a same perspective with different focal points, wherein each of the acquired multiple images corresponds to one color of the different color sensors of a pixel sensor of an image sensor;
   selecting parameters for preparing a displayable image, wherein the selected parameters indicates a preference for one of the acquired multiple images over the other acquired multiple images;
   constructing an image using the data of the acquired multiple images according to the selected parameters; and
   displaying the constructed image.

2. A method according to claim 1, wherein said acquiring is performed using a single imaging device that includes a lens that converges light used to make the multiple images onto the image sensor.

3. A method of controlling depth of field of an image by a computer after the image has been taken based on the data acquired while taking the image, comprising:
   using a lens to converge the image on a mosaic image sensor in which each sensor pixel of the mosaic image sensor has at least four types of color sensors;
   separating the image into separate color sub images from a same perspective, each sub image corresponding to a respective type of color sensor of the mosaic image sensor;
   selecting one of the sub images to serve as a basis for a re-constructed image based on a desired focus of the sub image; and
   re-constructing the image based on luminance values of the selected sub image and adjusted luminance values of the other sub images, wherein the luminance values of the other sub images are adjusted for having different focal points than the selected sub image.

4. A method according to claim 1, wherein said acquiring is performed using multiple imaging devices located next to each other and focused to different positions along a common axis.

5. A method according to claim 4, wherein each image acquired by said multiple imaging devices forms a multicolor image and is used to create multiple images by separating each multicolor image to sub images, each with the data of a different color, wherein each color has a different focal point; and then constructing a color image from each sub image by combining it with the data of the other sub images adjusted according to the focal point of the sub image being used to construct the color image.

6. A method according to claim 1, wherein said selecting is performed before taking images.

7. A method according to claim 1, wherein said selecting is performed after taking images.

8. A method according to claim 7, wherein said selecting is performed automatically by the computer based on the content of the images.

9. A method according to claim 1, wherein the selected parameters enable the user to select focal points which correspond to the focal points of the acquired multiple images.

10. A method according to claim 1, wherein the selected parameters enable the user to select focal points which form a continuum from the closest focal point to the furthest focal point available in the acquired images.

11. A method according to claim 1, wherein the selected parameters define a single continuous area that is displayed in focus.

12. A method according to claim 1, wherein the selected parameters define more than one continuous area that is displayed in focus.

13. A method according to claim 1, wherein the selected parameters define a continuous area that is displayed in focus up to a selected point.

14. A method according to claim 1, wherein the selected parameters define a continuous area that is displayed in focus from a selected point.

15. A method according to claim 1, wherein said acquiring is performed by taking multiple images sequentially while adjusting the focal point of a lens between each image.

16. A method according to claim 1, wherein the image sensor comprises a plurality of pixel sensors, wherein each pixel sensor comprises at least four different color sensors.

17. A system for controlling depth of field of an image after the image has been taken based on the data acquired while taking the image, comprising:

an imaging device to record image data;

a mosaic image sensor installed in the imaging device, wherein the mosaic image sensor comprises pixels that each uses at least three types of color sensors;

a computer to analyze the data recorded by the mosaic image sensor; and a display to display images provided by the computer, wherein the computer is adapted to construct multiple images from the data provided by the mosaic image sensor resulting from a single image, receive user input that defines parameters for displaying an image, and construct an image to conform to the parameters using the data provided by the mosaic image sensor resulting from the single image, wherein each of the constructed multiple images corresponds to one of the colors related to one of the types of color sensors and are from a same perspective, wherein the parameters include a focal point that can fall anywhere within a range of focal points, wherein a beginning of the range and an end of the range correspond to focal points of at least two of the three types of color sensors.

18. The system according to claim 17, comprising:

a lens that causes light to converge on the mosaic image sensor.

19. The system according to claim 17, wherein the user input enables a selection of non-continuous areas along a focal point axis so that first objects in the constructed image that are in the selected areas are in focus and second objects in the constructed image that are not in the selected areas are out of focus.

20. The system according to claim 17, wherein the user input indicates a focal point that is not a focal point corresponding to one of the three types of color sensors.

* * * * *